United States Patent
Teng et al.

(10) Patent No.: US 12,181,705 B2
(45) Date of Patent: Dec. 31, 2024

(54) BACKLIGHT UNIT FOR A MOTOR VEHICLE DISPLAY APPARATUS INTEGRATED WITH A HEAT TRANSFER DEVICE AND METHOD THEREOF

(71) Applicant: Continental Automotive Technologies GmbH, Hannover (DE)

(72) Inventors: Ling Chih (Daniel) Teng, Singapore (SG); Merilyn Ng, Singapore (SG); Huey Lin Joyce Ling, Singapore (SG); Zhixiong Jiang, Singapore (SG); Sheng Hoe Ching, Singapore (SG)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 18/201,961

(22) Filed: May 25, 2023

(65) Prior Publication Data
US 2023/0384508 A1 Nov. 30, 2023

(30) Foreign Application Priority Data
May 25, 2022 (GB) ..................................... 2207631

(51) Int. Cl.
*F21V 8/00* (2006.01)
(52) U.S. Cl.
CPC ......... *G02B 6/0085* (2013.01); *G02B 6/0088* (2013.01)
(58) Field of Classification Search
CPC ......... G02F 1/133385; G02F 1/133628; G02F 1/133382; H01L 23/427; H01L 23/473; F28D 5/04; G02B 6/0085; G02B 6/0088
See application file for complete search history.

(56) References Cited

U.S. PATENT DOCUMENTS

| | | | |
|---|---|---|---|
| 8,482,695 B2 * | 7/2013 | Dunn | H05K 7/20145 |
| | | | 361/695 |
| 9,366,484 B2 * | 6/2016 | Yu | G02F 1/133615 |

(Continued)

FOREIGN PATENT DOCUMENTS

| CN | 106163241 A | 11/2016 |
|---|---|---|
| CN | 109298762 A | 2/2019 |

(Continued)

OTHER PUBLICATIONS

Search Report dated Nov. 22, 2022 from corresponding GB patent application No. 2207631.9.

(Continued)

*Primary Examiner* — Matthew J. Peerce

(57) ABSTRACT

A heat transfer device for integrating with a backlight unit for an edge-lit motor vehicle display apparatus includes an anterior capillary tube operable to integrate with a rear side of the backlight unit, the anterior capillary tube further operable to dissipate heat from an anterior of a backlight unit of a motor vehicle display. The heat transfer device further includes a posterior capillary tube operable to be positioned away from the backlight unit, the posterior capillary tube further operable to dissipate heat from a posterior of a backlight unit of a motor vehicle display. The heat transfer device further comprises a phase changing medium operable to fluidly transfer between the first capillary tube and the second pillar tube during a heat transfer process, where the phase changing medium is operable to phase change between a gaseous state and a liquid state during the heat transfer process.

15 Claims, 8 Drawing Sheets

(56) References Cited

U.S. PATENT DOCUMENTS

| | | | |
|---|---|---|---|
| 10,321,615 B2 * | 6/2019 | Stellman | G02F 1/133382 |
| 10,750,645 B2 * | 8/2020 | Ehmke | B60K 37/00 |
| 2012/0229726 A1 | 9/2012 | Kim | |

FOREIGN PATENT DOCUMENTS

| | | | |
|---|---|---|---|
| CN | 113487963 A | 10/2021 | |
| DE | 102018000151 A1 | 7/2019 | |
| KR | 200401354 Y1 | 11/2005 | |
| KR | 100649106 B1 | 11/2006 | |
| KR | 1020110135553 A | 12/2011 | |

OTHER PUBLICATIONS

Search Report dated Oct. 16, 2023 from corresponding European patent application No. 23 15 8119.0.
Office Action issued on Oct. 8, 2024 from corresponding Korean patent application No. 10-2023-0066515.

\* cited by examiner

BACKLIGHT UNIT FOR A MOTOR VEHICLE DISPLAY APPARATUS INTEGRATED WITH A HEAT TRANSFER DEVICE AND METHOD THEREOF

CROSS-REFERENCE TO RELATED APPLICATION

This application claims the benefit of United Kingdom patent application No. 62207631.9, filed on May 25, 2022, which is hereby incorporated by reference.

TECHNICAL FIELD

This disclosure relates to backlight unit for a motor vehicle display apparatus. In particular, the backlight unit is a single piece of electronic component integrated with a heat transfer device, suitable for use in a motor vehicle display apparatus.

BACKGROUND

Display apparatus is commonly used in automotive industry for displaying vehicular information. A display apparatus includes an illumination source to transmit light rays towards a viewer, such that information displayed can be viewed on the displays screen. In operation, the illumination source generates heat and only 40% of electrical power is converted to light rays. The remaining 60% of electrical power is dissipated as heat. In automotive applications, temperature of an operating display apparatus has an ambient temperature of 85° C. Therefore, efficient thermal management to avoid overheating of display systems is crucial.

Conventionally, the illumination source is positioned directly behind a display layer and thermal management to dissipate heat spread out on a heated surface of the illumination source by radiation and convention through air. One commonly known method is to use a housing with good thermal conductivity properties. However, the drawback of this solution is that materials with good thermal conductivity properties such as aluminum or magnesium alloy makes the display apparatus heavy and expensive.

There is therefore a need to provide to provide a motor vehicle display apparatus that overcomes, or at least ameliorates, the problems described above. Furthermore, other desirable features and characteristics will become apparent from the subsequent detailed description and the appended claims, taking in conjunction with the accompanying drawings and this background of the disclosure.

SUMMARY

A purpose of this disclosure is to ameliorate the problem of overheating of motor vehicle display apparatus by providing the subject-matter of the independent claims.

Further purposes of this disclosure are set out in the accompanying dependent claims.

The objective of this disclosure is solved by an edge-lit motor vehicle display apparatus having a backlight unit integrated with at least one heat transfer device. The at least one heat transfer device includes an anterior capillary tube operable to integrate with a rear side of a backlight unit. The anterior capillary tube is further operable to dissipate heat from an anterior of a backlight unit of the motor vehicle display apparatus. A posterior capillary tube is operable to be positioned away from the rear side of the backlight unit. The posterior capillary tube is further operable to dissipate heat from a posterior of a backlight unit of a motor vehicle display. A phase changing medium is operable to fluidly transfer between the anterior capillary tube and the posterior capillary tube during a heat transfer process. The phase changing medium is operable to phase change between a gaseous state and a liquid state during the heat transfer process, to release latent heat from the rear side of the backlight unit.

An advantage of the above described aspect of this disclosure yields a heat transfer device for integrating with a backlight unit of a motor vehicle display apparatus, of which the heat transfer device contains a phase changing medium capable of fluidly transferring between two capillary tubes during a heat transfer process. More advantageously, the heat transfer device disclosed herein utilises two forms of heat transfer methods. Firstly, the walls of the heat transfer device transfer heat by conduction. Secondly, the phase changing medium transfer heat by convection. Consequently, heat dissipation efficiency is improved due to the amount of heat transfer and the rate of heat transfer achieved by the heat transfer device disclosed.

In one exemplary embodiment, the anterior capillary tube and the posterior capillary tube are connected by a C-shape connector, thereby forming a U-shape heat transfer device having a gap between the anterior capillary tube and the posterior capillary tube.

The advantage of the above aspect of this disclosure is to yield a single piece of U-shape heat transfer device with a first capillary tube, i.e. the anterior capillary tube functioning to dissipate heat from a heat source, such a hot surface of a display apparatus and a second capillary tube, i.e. the posterior capillary tube functioning to dissipate heat at a distance from the heat source. Advantageously, the aforesaid configuration provides an environment to allow a temperature difference between the anterior capillary tube and the posterior capillary tube, such that the phase changing mediums is operable to evaporate in a first capillary tube and condenses in a second capillary tube during a heat transfer process.

In one exemplary embodiment, the C-shape connector has a bending radius of at least three times a diameter of the heat transfer device.

The advantage of the above aspect of this disclosure is to achieve connecting the anterior capillary tube and the posterior capillary tube without any sharp and abrupt edges such that a fluid transfer of the phase changing medium between the anterior capillary tube and the posterior capillary tube during heat transfer process is achieved.

In one exemplary embodiment, the gap between the anterior capillary tube and the posterior capillary tube is at least 5 mm.

The advantage of the above aspect of this disclosure is to yield a difference between the anterior capillary tube and the posterior capillary tube, to provide an environment to allow a temperature difference between the anterior capillary tube and the posterior capillary tube, such that the phase changing mediums is operable to convert to a gaseous state in a first capillary tube and condenses in a second capillary tube during a heat transfer process. A 5 mm gap allows a temperature difference desired.

In one exemplary embodiment, the anterior capillary tube has a length of at least 150 mm.

The advantage of the above aspect of this disclosure is to yield a U-shape heat transfer device configuration which relatively short, such that the U-shape heat transfer device does not lose heat dissipation efficiency.

In one exemplary embodiment, the posterior capillary tube is at least partially positioned within a heat sink.

The advantage of the above aspect of this disclosure is to allow heat to be conducted by a heat sink from the posterior capillary tube and dissipated into the surrounding air in response to the phase changing medium being fluidly transferred to the posterior capillary tube.

In one exemplary embodiment, during the heat transfer process, the phase changing medium evaporates to the gaseous state within the anterior capillary tube to dissipate heat from the anterior of the backlight unit. Further, the phase changing medium is fluidly transferred from the anterior capillary tube in the gaseous state to the posterior capillary tube.

The advantage of the above aspect of this disclosure is to provide a heat dissipation by convection through the use of a phase changing medium, to remove heat from a hot surface of a motor vehicle display apparatus when in operation.

In one exemplary embodiment, during the heat transfer process, in response to the phase changing medium being fluidly transferred to the posterior capillary tube, the phase changing medium condenses to the liquid state within the posterior capillary tube when latent heat is released from the phase changing medium.

The advantage of the above aspect of this disclosure is to provide a heat dissipation by convection, such that latent heat is released when the phase changing medium condenses to a liquid state.

In one exemplary embodiment, the anterior capillary tube further includes a T-shape bar.

The advantage of the above aspect of this disclosure is to provide a means for integrating the heat transfer device with another electronic component.

In one exemplary embodiment, the posterior capillary tube has a length shorter than the anterior capillary tube.

The advantage of the above aspect of this disclosure is to accommodate changes in volume of the phase changing medium during convection to increase efficiency of heat dissipation.

The objective of this disclosure is also solved by a method to produce an edge-lit motor vehicle display apparatus according to of the aspects as disclosed herein, including integration of an anterior capillary tube and a posterior capillary tube on a rear side of a backlight unit of an edge-lit motor vehicle display apparatus.

The advantage of the above aspect of this disclosure is to provide a backlight unit integrated with a heat transfer device, that is suitable for edge-lit display apparatus and more in particular, motor vehicle display apparatus.

Another advantage of the above described aspect of this disclosure yields an backlight unit integrated with a heat transfer device which addresses the challenges of heat dissipation efficiency and selection of material used for housing of a motor vehicle display as discussed above.

The objective of this disclosure is further solved by a method of assembling a heat transfer assembly for integrating with a backlight unit for a motor vehicle display. The method includes providing a first capillary tube for dissipating heat from an anterior of a backlight unit of a motor vehicle display and providing a second capillary tube for dissipating heat from a posterior of a backlight unit of a motor vehicle display. The method also includes connecting, by way of a C-shape connector, an end of the first capillary tube to an end of the second capillary tube, thereby yielding a U-shape heat transfer device having a gap between the first capillary tube and the second capillary tube.

An advantage of the above described aspect of this disclosure yields a method of assembling a single piece of U-shape heat transfer device having a first capillary tube, i.e. the anterior capillary tube functioning to dissipate heat from a heat source, such a hot surface of a display apparatus and a second capillary tube, i.e. the posterior capillary tube functioning to dissipate heat at a distance from the heat source. Advantageously, the two capillary tubes are connected by a C-shape connector, which provides a smooth, curved channel to allow a phase changing medium to fluidly transfer between the first capillary tube and the second capillary tube.

Also advantageously, the aforesaid configuration provides an environment to allow a temperature difference between the anterior capillary tube and the posterior capillary tube, such that the phase changing mediums is operable to change into a gaseous state in a first capillary tube and condenses in a second capillary tube during a heat transfer process.

In one exemplary embodiment, further includes filling a phase changing medium within the U-shape heat transfer device under a vacuum condition.

The advantage of the above aspect of this disclosure is to provide a heat transfer device with a phase changing medium contained within the heat transfer device, for heat dissipation by convection.

In one exemplary embodiment, the method also includes providing a heat sink and at least partially positioning the second capillary tube within the heat sink.

The advantage of the above aspect of this disclosure is to provide a means to rapidly dissipate heat from the second capillary tube or the posterior capillary tube to the surrounding air when the heat transfer device is integrated in a backlight unit.

In one exemplary embodiment, the method further includes attaching at least a portion of the first capillary tube to a T-shape bar by way of one or more fasteners.

The advantage of the above aspect of this disclosure is to include a step of attaching the first capillary tube to a T-shape bar, to provide a means to integrate the heat transfer device assembled with a backlight unit.

The objective of this disclosure is further solved by a method of assembling an edge-light motor vehicle display apparatus for use in a motor vehicle. The method includes providing at least one heat transfer device as described above. The method further includes providing a housing for a rear side of a motor vehicle display apparatus The housing defines at least one slot. The method also includes extending at least a portion of the at least one heat transfer device through the at least one slot of the housing, thereby yielding an edge-lit motor vehicle display apparatus integrated with at least one heat transfer device.

An advantage of the above described aspect of this disclosure yields a method of assembling a motor vehicle display apparatus having a rear-side housing integrated with a heat transfer device as disclosed herein.

In one exemplary embodiment, the at least a portion of the at least one heat transfer device is a T-shape bar attached to the heat transfer device.

The advantage of the above aspect of this disclosure is to provide a means for integrating the heat transfer device with the motor vehicle display apparatus.

In one exemplary embodiment, the method also includes adhering an array of light emitting diodes (LEDs) along a length of the T-shape bar.

The advantage of the above aspect of this disclosure is to include a step in the assembling process to produce an illumination source using a portion of the heat transfer device.

In one exemplary embodiment, the method further includes fixing a light conductor adjacent to T-shape bar, the light conductor for transmitting light rays towards a viewing area of the motor vehicle display apparatus.

The advantage of the above aspect of this disclosure is to include a step in the assembling process to include a light conductor, such that the light conductor is operable to receive light rays from the array of LED, to transmit light rays towards a viewing area of the motor vehicle display apparatus.

In one exemplary embodiment, the method also includes aligning the array of light emitting diodes (LEDs) along the length of the T-shape bar to a length of the light conductor, thereby providing a backlight unit for an edge-lit motor vehicle display.

The advantage of the above aspect of this disclosure is to include a step in the assembling process to yield a backlight unit integrated with a heat transfer device as disclosed herein, where the backlight unit is suitable for use as an illumination source of an edge-lit motor vehicle display.

BRIEF DESCRIPTION OF DRAWINGS

Other objects and aspects of this disclosure will become apparent from the following description of embodiments with reference to the accompanying drawings in which.

In various embodiments described by reference to the above figures, like reference signs refer to like components in several perspective views and/or configurations.

DETAILED DESCRIPTION

The following detailed description is merely exemplary in nature and is not intended to limit the disclosure or the application and uses of the disclosure. Furthermore, there is no intention to be bound by any theory presented in the preceding background of the disclosure or the following detailed description. It is the intent of this disclosure to present a heat transfer device comprising a phase changing medium to dissipate heat from a hot surface using convection. In particular, the heat transfer device may be assembled to integrate with a backlight unit of an edge-lit motor vehicle display apparatus.

Hereinafter, the term "motor vehicle display apparatus" shall refer to display apparatus capable of displaying vehicle information, which may include central display of dashboard, a hybrid cluster and digital cluster.

The term "phase change" or "phase changing" used in the context of this disclosure may refer to aggregated phases of materials.

The term "first", "second", "third" and the like used in the context of this disclosure may refer to modification of different elements in accordance with various exemplary embodiments, but not limited thereto. The expressions may be used to distinguish one element from another element, regardless of sequence of importance. By way of an example, "a first capillary tube" and "a second capillary tube" may indicate different capillary tubes regardless of order or importance. On a similar note, a first capillary tube may be referred to as the second capillary tube and vice versa without departing from the scope of this disclosure. For clarity and brevity, "a first capillary tube" may refer to "an anterior capillary tube" and "a second capillary tube" may refer to "a posterior capillary tube" when describing various different exemplary embodiments in this disclosure.

Henceforth, in the context herein, the term "a first capillary tube" or "anterior capillary tube" may refer to a capillary tube positioned nearer to a housing of a motor vehicle display apparatus, or a capillary tube positioned nearer to a backlight unit of a motor vehicle display apparatus as disclosed herein. On a similar note, the term "second capillary tube" or "posterior capillary tube" may refer to a capillary tube positioned further or at a distance away from a housing of a motor vehicle display apparatus, or a capillary tube positioned further or at a distance away from a backlight unit, for integrating with a motor vehicle display apparatus.

Figure 1:
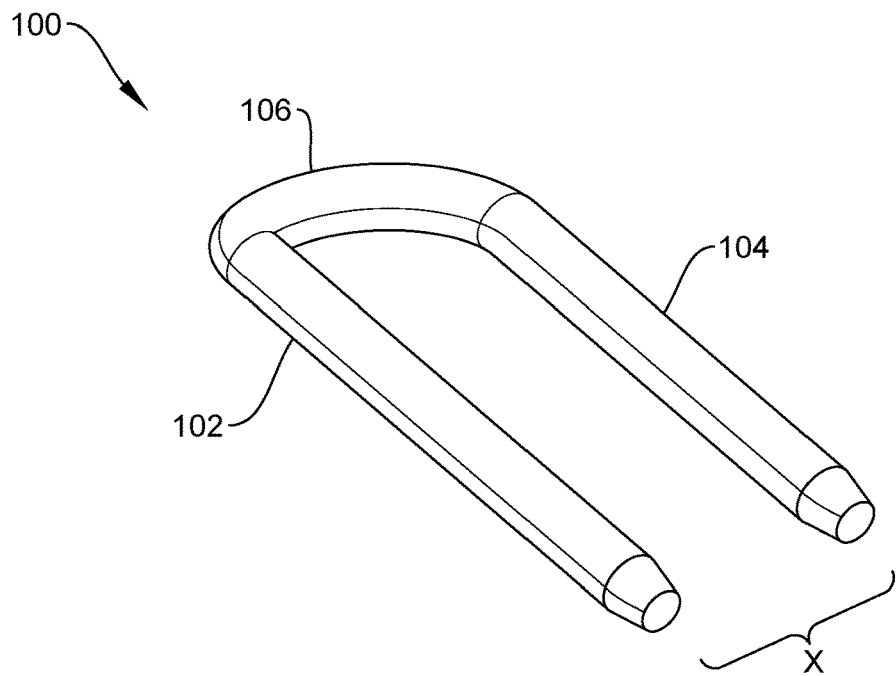
FIG. 1. shows a heat transfer device in accordance with an exemplary embodiment.

Referring to FIG. 1 of the accompanying drawings which shows a heat transfer device 100 in accordance with an exemplary embodiment, the heat transfer device 100 comprises a first capillary tube 102 and a second capillary tube 104. An end of the first capillary tube 102 is connected to an end of the second capillary tube 104 using a C-shape connector, to yield a U-shape heat transfer device 100 with a gap X therebetween. In one embodiment, the C-shape connecter is at least three times a diameter of the heat transfer device 100, to provide a smooth, curved channel to allow a phase changing medium (not shown in figures) to fluidly transfer between the first capillary tube 102 and the second capillary tube 104 during convection. In one embodiment, the gap X between the first capillary tube 102 and the second capillary tube 104 is at least 5 mm apart. This gap X allows a temperature difference between the first capillary tube or the anterior capillary tube 102 and the second capillary tube or the posterior capillary tube 104, such that the phase changing mediums is operable to change into a gaseous state in a first capillary tube and condenses to a liquid state in a second capillary tube during a heat transfer process.

The phase changing medium is added to the heat transfer device 100 under almost vacuum condition. A suitable type of phase changing medium may be distilled water. The phase changing medium may changes into a gaseous state very quickly at an operational temperature of 30° C. or higher. During a heat transfer process, the phase changing medium evaporates and converts to a gaseous state within the first capillary tube or anterior capillary tube 102 to dissipate heat from a hot surface. The phase changing medium may be fluidly transferred from the first capillary tube or the anterior capillary tube 102 in the gaseous state to the second capillary tube or posterior capillary tube 104 through the C-shape connector 106. The aforesaid configuration yields a single heat transfer device 100 which provides two forms of heat transfer method, i.e., dissipation of heat by conduction through walls of the heat transfer device 100, and dissipation of heat by convection through phase changing between evaporation and condensation of the phase changing medium. Advantageously, the aforesaid configuration improves heat dissipation efficiency due to the amount of heat being transferred and the rate of heat dissipation for removal of heat from a hot surface by using two forms of heat dissipation methods.

A main advantage of using a phase changing medium in heat transfer device 100 is to achieve higher thermal conductivity than a solid copper or solid aluminum rod of the same size and shape. By comparison, a solid copper road conducts thermal conductivity at approximately 390 W/m-k while the heat transfer device 100 disclosed may be at least five times higher compared to the thermal conductivity of solid copper rod. More advantageously, integrating heat transfer device 100 to a motor vehicle display apparatus addresses eliminates the require of display housing made of heavy and expensive thermal conductive materials.

Figure 2:
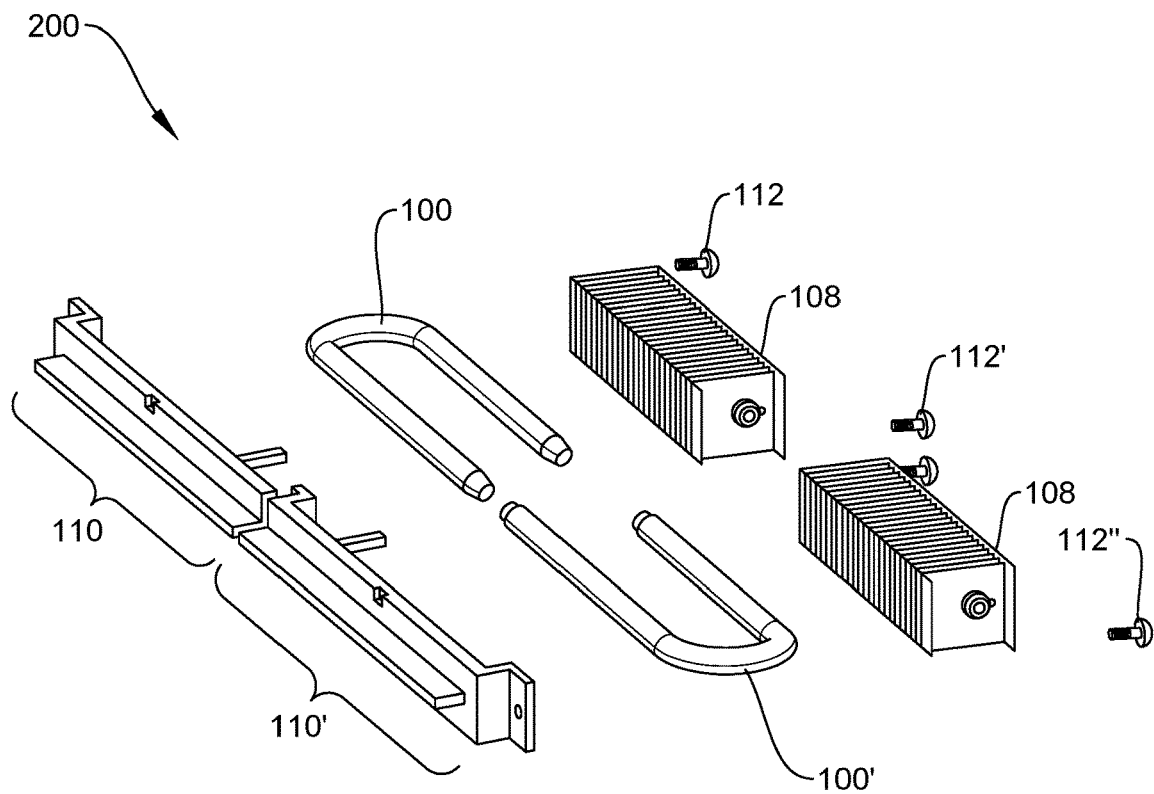
FIG. 2 shows an exploded view of a heat transfer assembly in accordance with an exemplary embodiment.

FIG. 2 shows an exploded view of a heat transfer assembly 200 in accordance with a exemplary embodiment. In this embodiment, two heat transfer assemblies are shown. The heat transfer assembly 200 includes at least one heat transfer device 100 as disclosed above, with at least one heat sink 108 having a cavity to at least partially position the second capillary tube or the posterior capillary tube 104 within the heat sink 108. The heat sink 108 is to allow heat to be conducted by a heat sink from the posterior capillary tube 104 and dissipated into the surrounding air in response to the phase changing medium being fluidly transferred to the posterior capillary tube 104. The heat transfer assembly 200 may further include at least one T-shape bar 110. It shall be understood by a skilled practitioner, it is possible to use at least two elongated bar of suitable material to form a T-shape bar 110 or simply use a T-shape bar 100 fabricated for such purposes, but not limited thereto. The T-shape bar 110, heat transfer device 100 and the heat sink 108 may be assembled or attached together as a single component by way of one or more fasteners, such as screws. An advantage of using a T-shape bar 110 is to provide a means to integrate the heat transfer assembly 200 with a motor vehicle display apparatus, which will be further discussed below.

Figure 3:
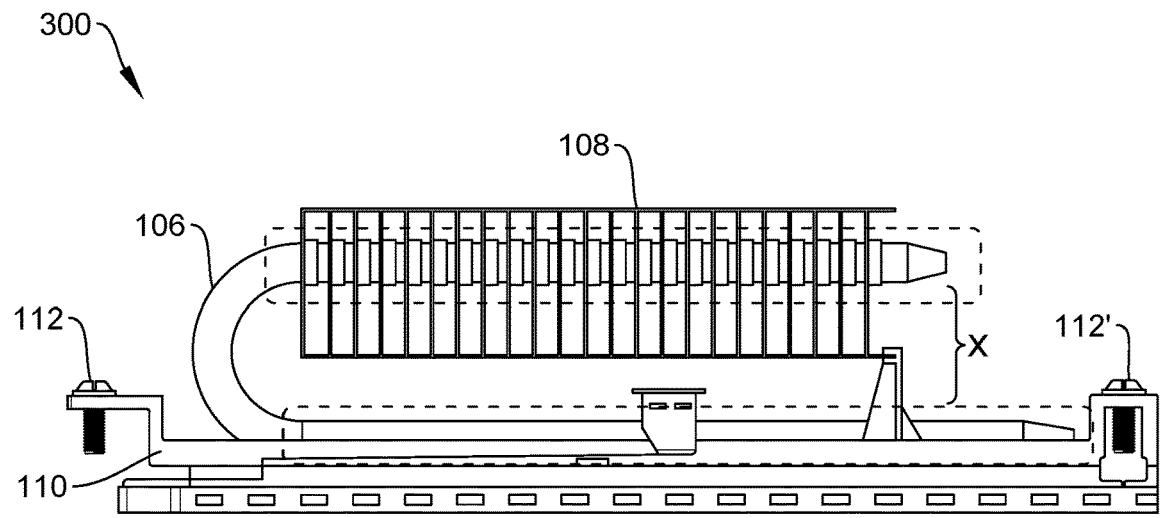
FIG. 3 shows a perspective view of a heat transfer assembly in accordance with an exemplary embodiment.

As shown in FIG. 3, is a perspective view of a heat transfer assembly 300 in accordance with an exemplary embodiment, which shows the second capillary tube or posterior capillary tube 104 at least partially positioned within a heat sink 108. In this embodiment, the heat sink 108 does not cover gap X as shown in FIG. 3.

Figure 4A:
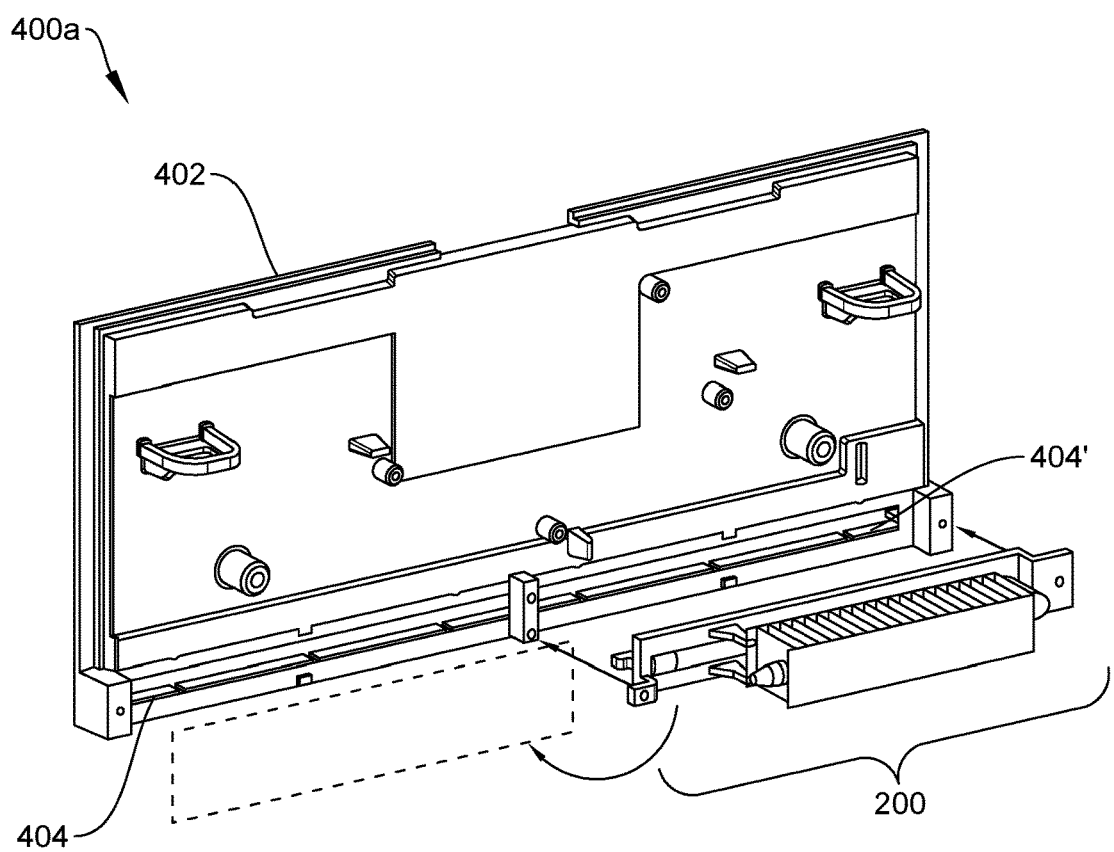
FIG. 4a shows a rear view of a heat transfer assembly in accordance with an exemplary embodiment.

Referring to FIG. 4a which shows a rear view 400a of a heat transfer assembly 400a in accordance with an exemplary embodiment, the heat transfer assembly 200, 300 is integrate with a rear-side housing 402 of a motor vehicle display. The rear-side housing 402 includes at least one slot 404. The at least one slot 404, 404' is operable to receive a portion of the at least one heat transfer assembly 200, 300. Preferably a least a portion of the T-shape bar 110 is extended through the at least one slot 404, 404', to achieve integrating the heat transfer assembly with a motor vehicle display apparatus.

Figure 4B:
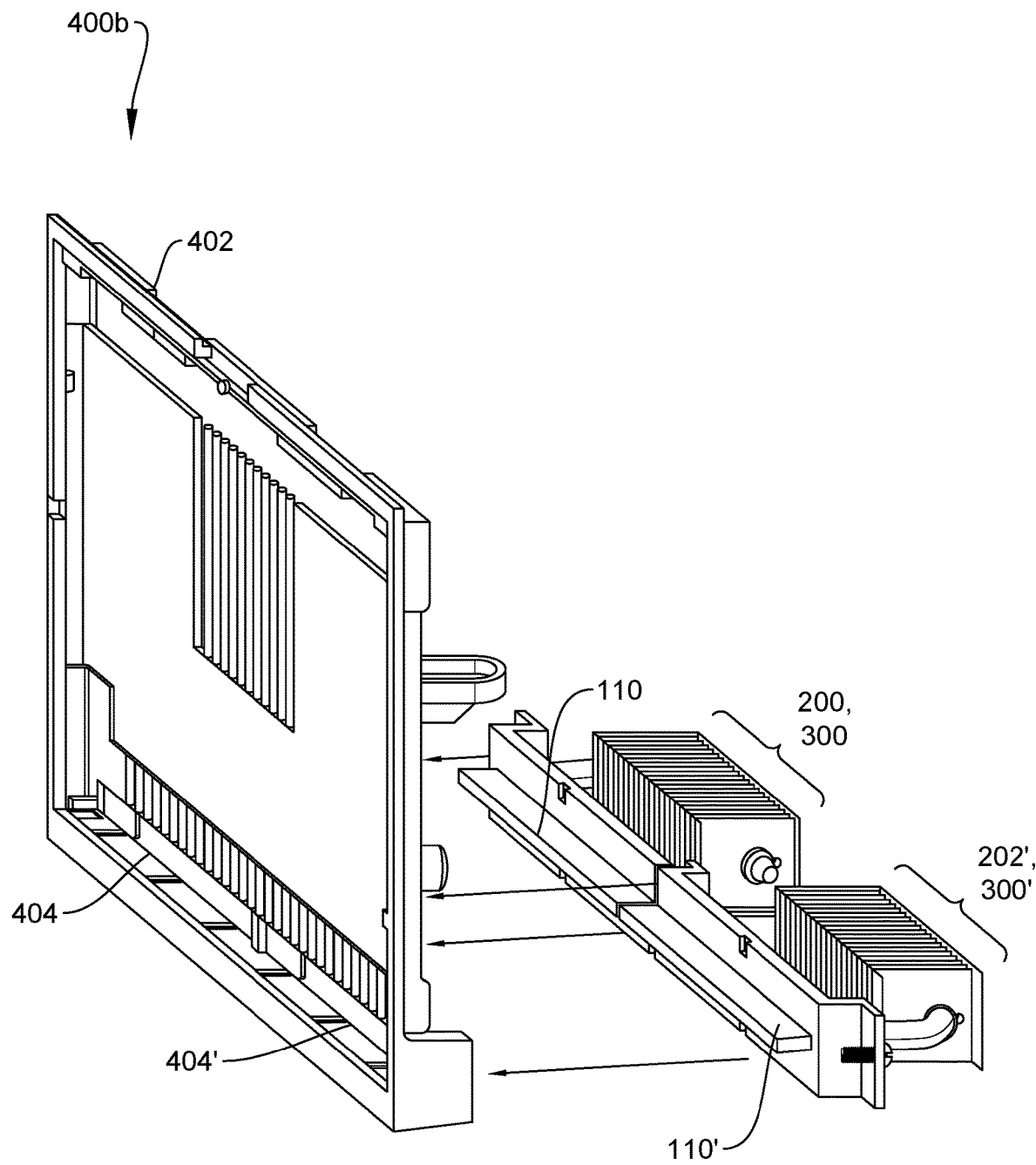
FIG. 4b shows a side view of a heat transfer assembly in accordance with an exemplary embodiment.

In an exemplary embodiment as shown in FIG. 4b which illustrates a side view 400b of a heat transfer assembly, two heat transfer assembly 200, 300, are integrated with a rear-side housing 402 of a motor vehicle display apparatus, comprising at least two slots 400, 400' for extending the T-shape bar 110, 110' therethrough.

In both exemplary embodiments as shown in FIG. 4a and FIG. 4b, the rear-side housing 402 may be made of non-thermal conductive material, such as plastic. As discussed above, one of the advantages of the inventive concept of this disclosure is to address the use of heavy, expensive materials with good thermal conductivity characteristics. By integrating heat transfer device 100 to a motor vehicle display apparatus, the housing may be replaced with non-thermal conductive materials without compromising the heat dissipation efficiency of the heat transfer device 100 for removing heat from a motor vehicle display apparatus.

Figure 5:
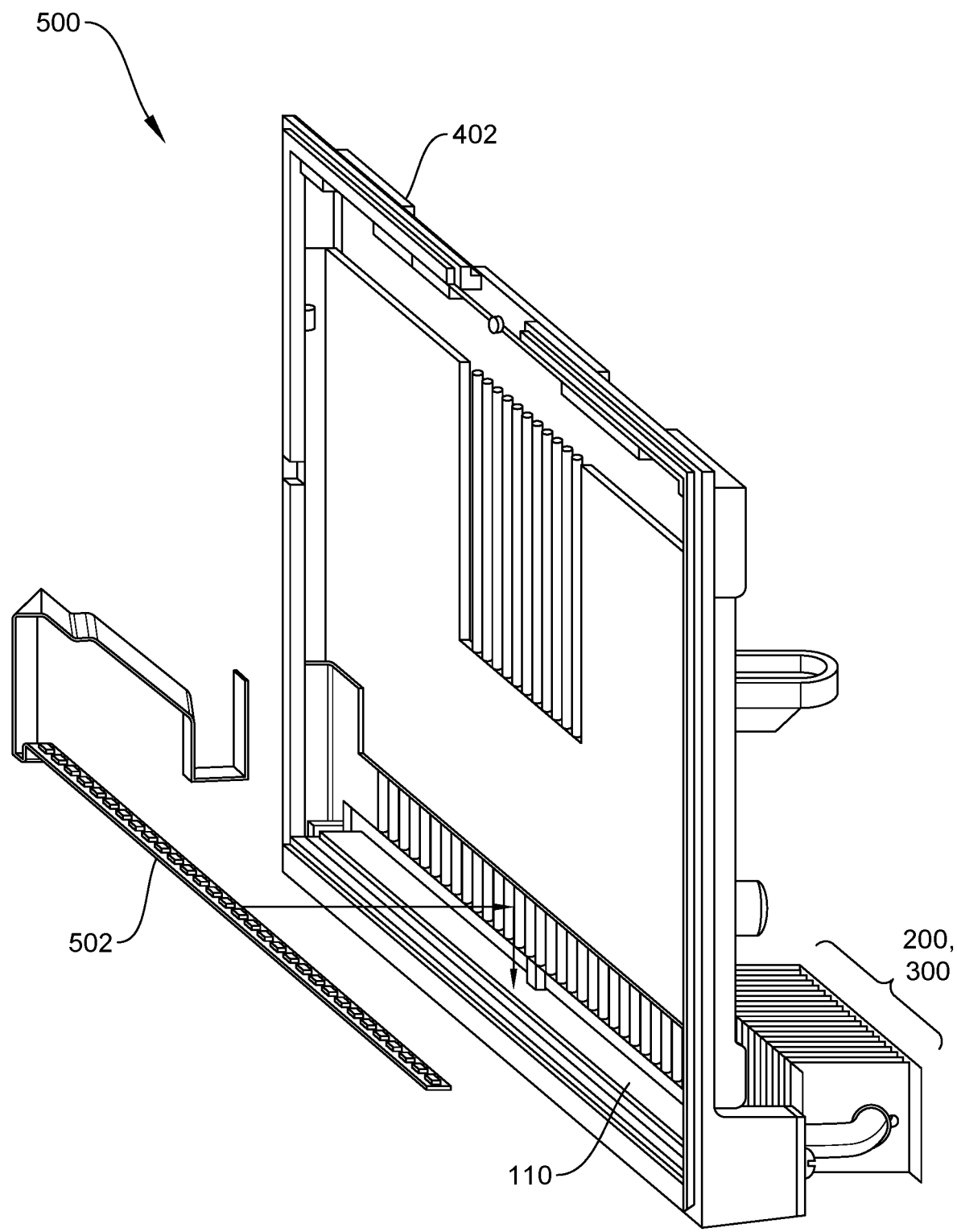
FIG. 5 shows a perspective view of a backlight unit in accordance with an exemplary embodiment.

FIG. 5 shows a perspective view of an illumination source 500 in accordance with an exemplary embodiment. As shown in FIG. 5 is a rear-side housing 402 integrated with a heat transfer assembly 200, 300 with at least a portion of the T-shape bar extending through at least one slot provided by the rear-side housing 402. An array of light emitting diodes (LEDs) 502 is adhered onto a length of the T-shape bar 110 to yield an illumination source. Preferably, the length is a surface of the T-shape bar 110 extending through the at least one slot provided by the rear-side housing 402. An advantage of the aforesaid configuration is to assemble an illumination source for an edge-lit motor vehicle display apparatus which is integrated with the heat transfer assembly 202 as disclosed. In this manner, heat generated by the illumination source from the illumination source 500 is dissipated by the anterior capillary tube 102 of the heat transfer device 100, causing a phase changing medium in the anterior capillary tube 102 to evaporate and transfer into a gaseous state due to convection. In response, the vapor is fluidly transferred to the posterior capillary tube 104, through the C-shape connector 106. The phase changing medium in a gaseous state condenses into a liquid state as the heat sink 108 rapidly dissipate heat from the posterior capillary tube 104 to the surrounding, thereby achieving heat dissipation efficiency.

Figure 6:
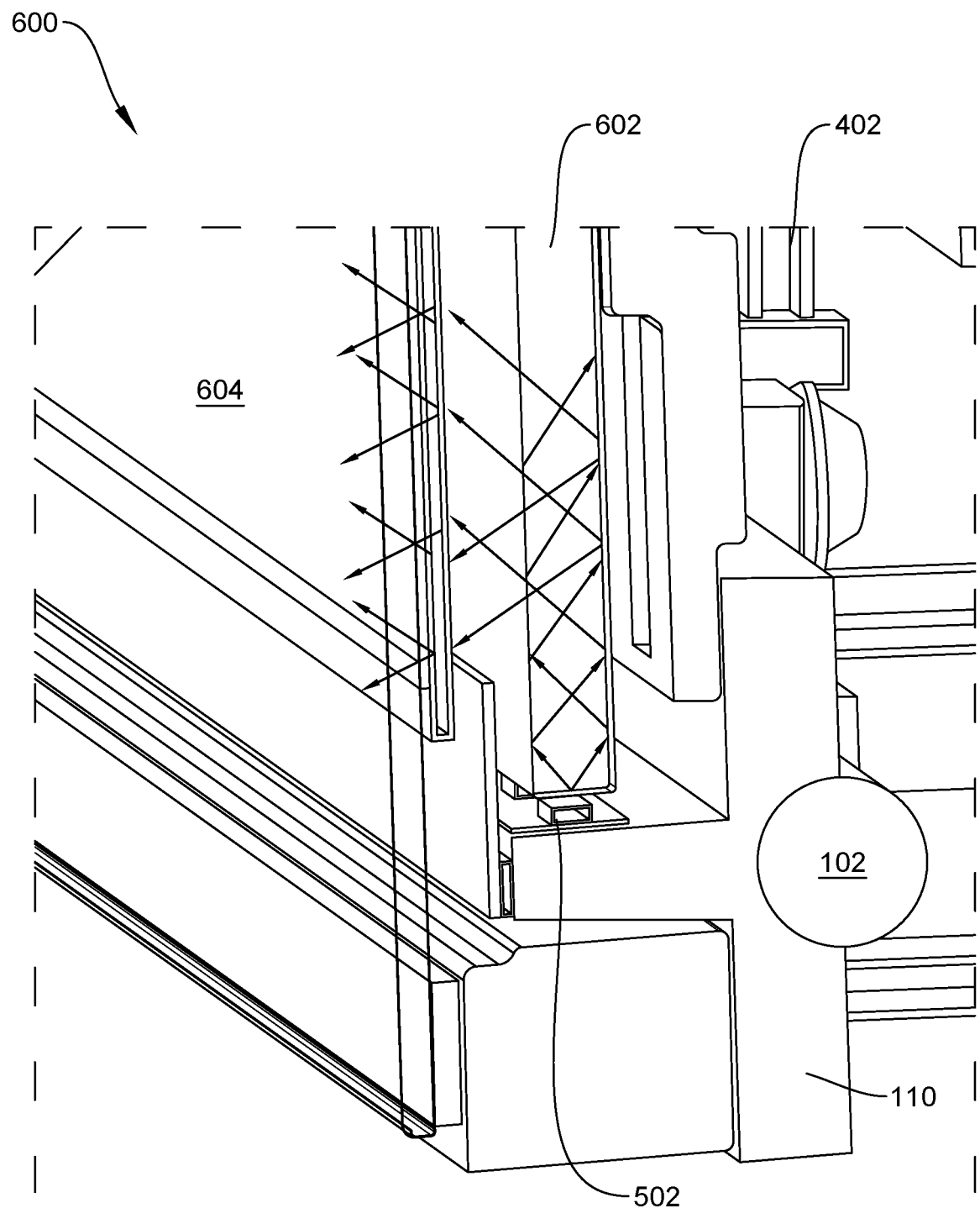
FIG. 6 shows a perspective view of an edge-lit motor vehicle display apparatus in accordance with an exemplary embodiment.
Figure 7:
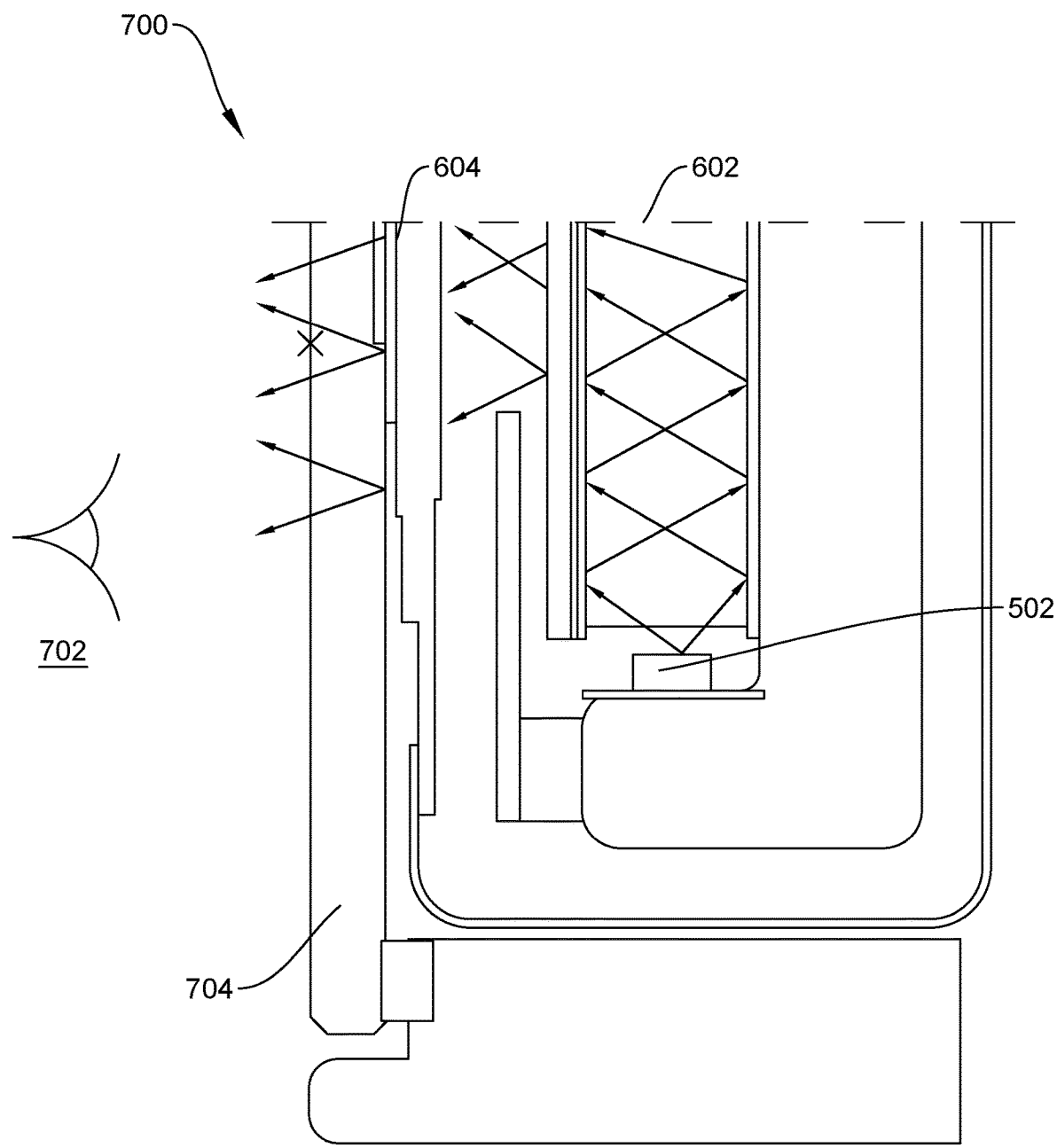
FIG. 7 shows a side view of an edge-lit motor vehicle display apparatus in accordance with an exemplary embodiment.

FIG. 6 shows a perspective view of an edge-lit motor vehicle display apparatus 600 in accordance with an exemplary embodiment. As explained above, the T-shape bar 110 from the heat transfer assembly 200, 300 extends through a slot of a rear-side housing 402 of a motor vehicle display, with an array of LED 502 adhered to a length of the T-shape bar 110 to form an illumination source 500. The T-shape bar 110 is attached to a U-shape heat transfer device 100 as disclosed herein, with an anterior capillary tube 102 in connect with the T-shape bar 110. A light conductor 602 is displaced adjacent to the array of LED 502, such that light rays emitting from the array of LED 502 may be transmitted through the light conductor 602. The light conductor 602 may include reflective surface, for example reflective foil adhere to a non-viewing side or rear side of the motor vehicle display apparatus, such that the light rays are reflected and transmitted through a display layer 604, as indicated by the arrows shown in FIG. 6. As shown in FIG. 7 which illustrates a side view of an edge-lit motor vehicle display apparatus 700 in accordance with a preferred embodiment, the motor vehicle apparatus may include a cover 704. The light rays emitting from the array of LED 502 is transmitted through the light conductor 602 and reflected through the display layer 604, towards a viewing area 702. Suitable types of display layers include liquid crystal display (LCD) layer and thin film transistor (TFT) display layer.

Figure 8A:
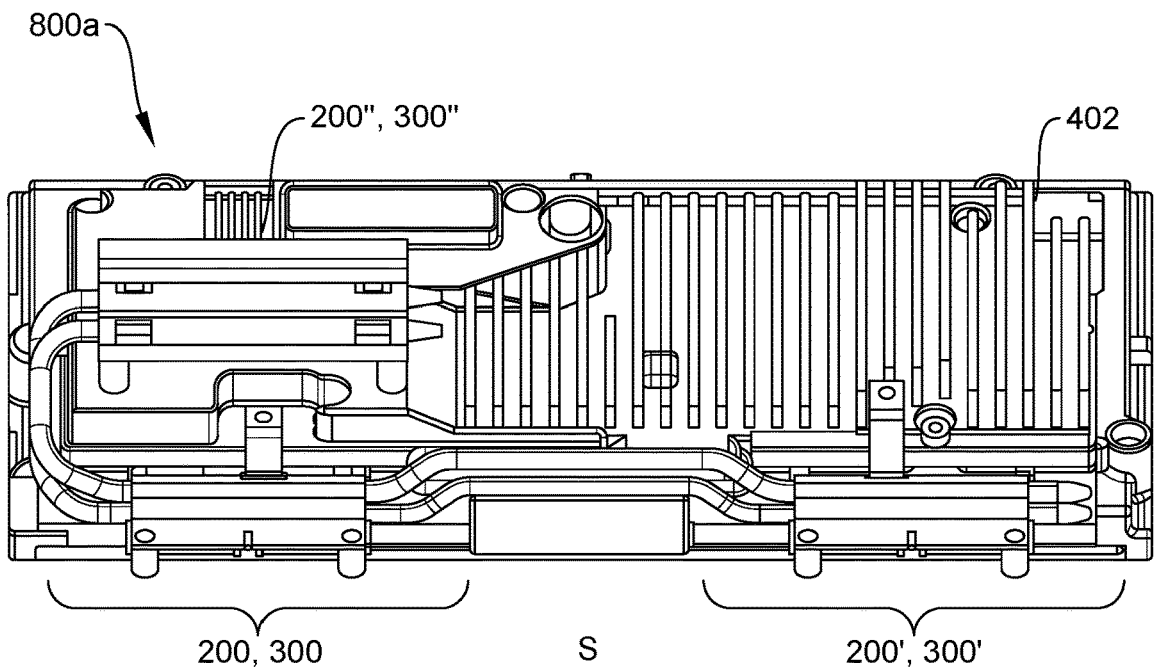
FIG. 8a shows a rear-view of an edge-lit motor vehicle display apparatus in accordance with an exemplary embodiment.
Figure 8B:
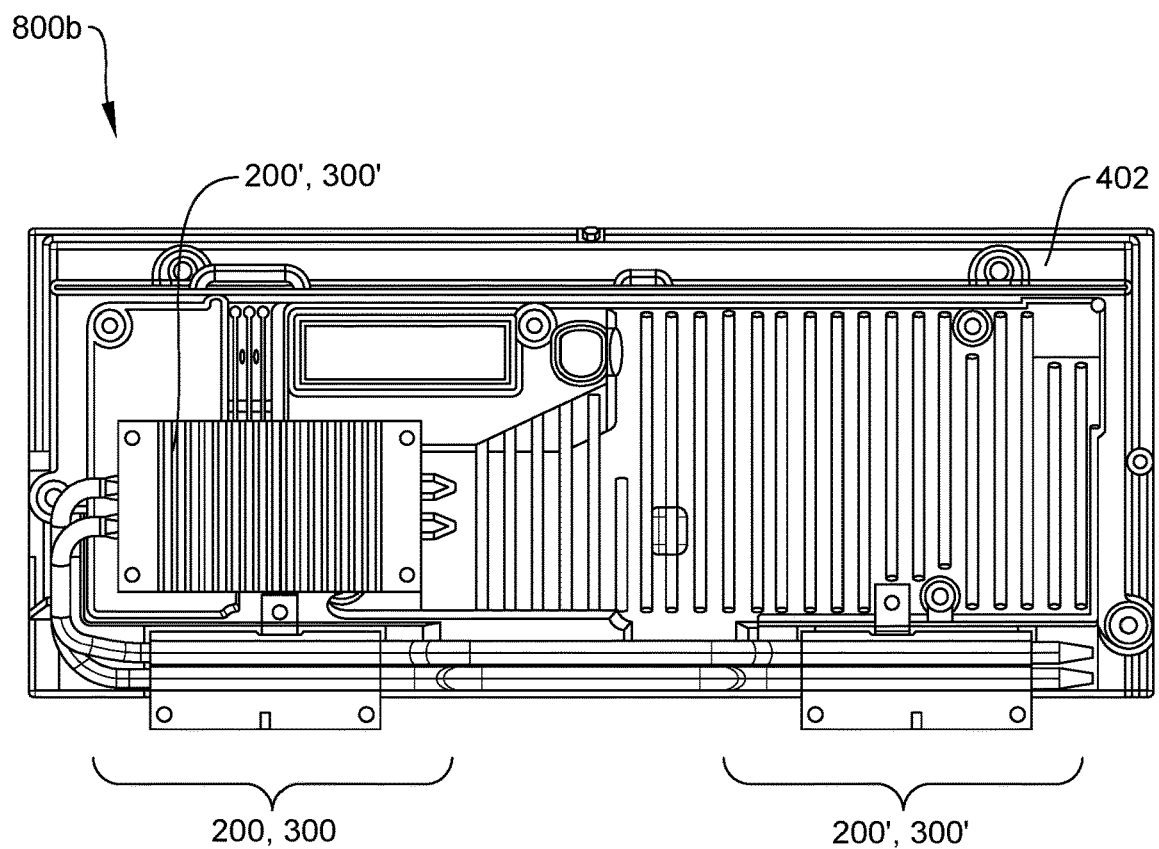
FIG. 8b shows a rear-view of an edge-lit motor vehicle display apparatus in accordance with an exemplary embodiment.

FIG. 8a shows a rear-view of an edge-lit motor vehicle display apparatus 800a in accordance with an exemplary embodiment. As shown on FIG. 8a, the heat transfer assembly 200, 303 may be placed long a length of a rear-side housing 402, as disclosed in the exemplary embodiments above. Additionally, the heat transfer assembly 200 may be mounted on a portion of a body of the rear side housing 402 of a motor vehicle display apparatus, where the position of the heat transfer assembly 200, 300 corresponds to a position of the light conductor 602. In this embodiment, the heat transfer assembly 200, 300 is fastened to the rear side housing 402 using brackets, but not limited thereto. More advantageously, the heat transfer assembly 200, 300 is integrated with the backlight unit of the motor vehicle display apparatus and is operable to dissipate heat from the backlight unit when in operation FIG. 8b shows a rear-view of an edge-lit motor vehicle display apparatus 800b in accordance with an exemplary embodiment. In addition to at least two heat transfer assembly 200, 303 and 200', 300' placed long a length of a rear-side housing 402 and held onto using brackets, a third heat transfer assembly 200", 300" may be positioned corresponding to other electronic components which may require heat dissipation, with at least two heat sinks 108 at least partially enclosing the posteriori capillary tube 104.

Figure 8C:
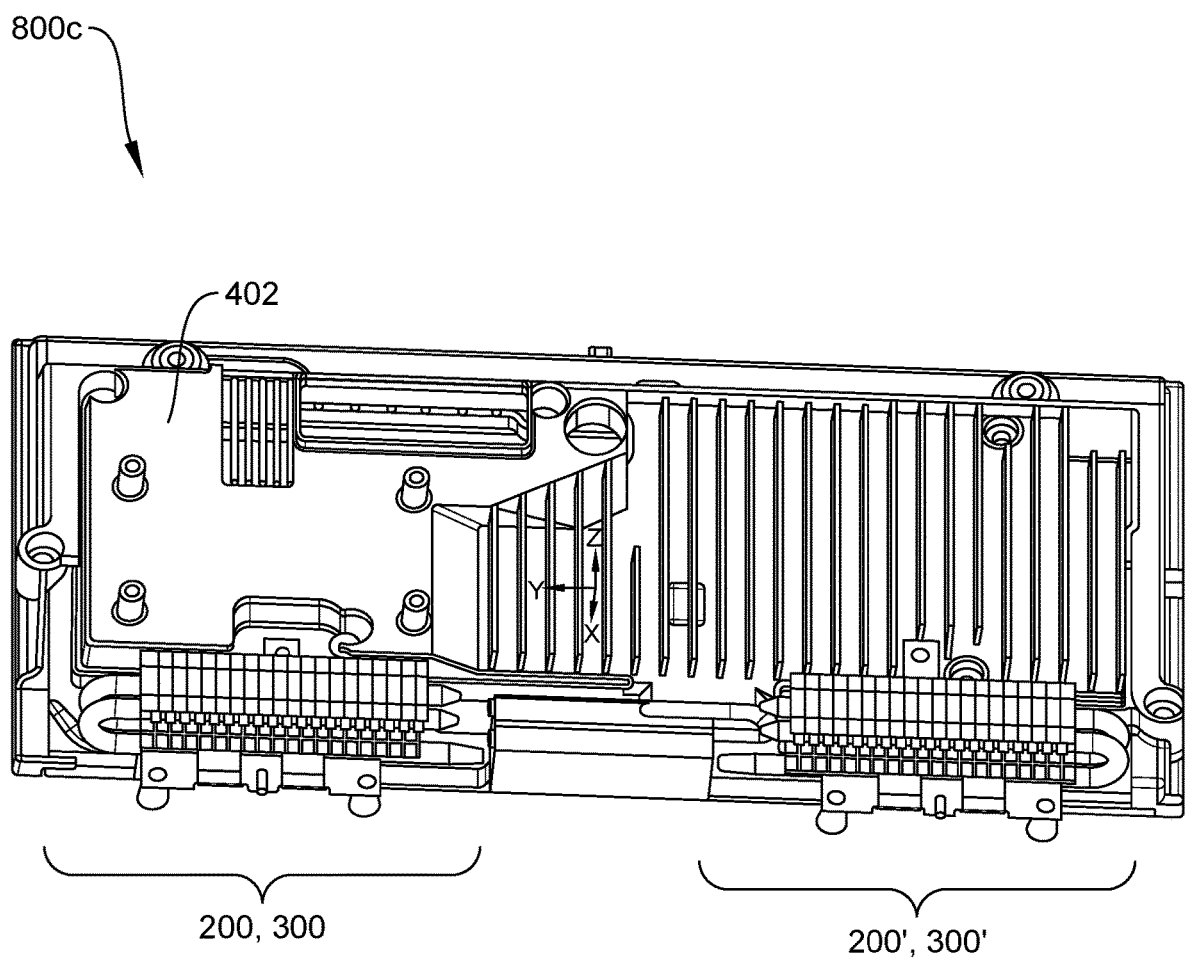
FIG. 8c shows a rear-view of an edge-lit motor vehicle display apparatus in accordance with an exemplary embodiment.

Turning now to FIG. 8c which shows a rear-view of an edge-lit motor vehicle display apparatus 800c in accordance with an exemplary embodiment, at least two heat assemblies are integrated with a rear side housing 402, each of the heat transfer assembly comprises at least two heat transfer devices 100. Each of the posterior capillary tube 104 is at least partially positioned within a heat sink 108.

Each heat transfer device may cover half of a width of the backlight unit, to optimize heat dissipation efficiency.

Aspects of the above embodiments discloses a device, assembly, and method of assembling a heat transfer device 100, a heat transfer assembly 200, 300, method of integrating the heat transfer assembly 200, 300 with a rear-side housing of a motor vehicle display apparatus and utilizing at least a portion of the heat transfer assembly to provide an illumination source of a backlight unit for an edge-lit motor vehicle display apparatus. The edge-lit motor vehicle display apparatus comprising a backlight unit integrated with at least one heat transfer device 100 is suitable for mounting onto a compartment of a motor vehicle.

Thus, it can be seen that a heat transfer device having the advantage of using a phase changing medium to achieve higher thermal conductivity over solid thermal conductivity rods for dissipation of heat from electronic components has been provided. Further, the heat transfer device as disclosed may be assembled and integrated to a display apparatus, in particular a motor vehicle display apparatus. More specifically, because of the higher thermal conductivity of achievable by the heat transfer device disclosed, conventional motor vehicle display housing made of high thermal conductivity materials may be replaced with plastic housing, thus achieving cost efficiency. In addition, the heat transfer device may be assembled and integrated with a rear-side housing to produce an illumination source for a backlight unit, thereby yielding thinner or slimmer edge-lit motor vehicle display apparatus, with high heat dissipation rate. While exemplary embodiments have been presented in the foregoing detailed description of the disclosure, it should be appreciated that a vast number of variation exist.

It should further be appreciated that the exemplary embodiments are only examples, and are not intended to limit the scope, applicability, operation or configuration of the disclosure in any way. Rather, the foregoing detailed description will provide those skilled in the art with a convenient road map for implementing an exemplary embodiment of the disclosure, it being understood that various changes may be made in the function and arrangement of elements and method of operation described in the exemplary embodiment without departing from the scope of the disclosure as set forth in the appended claims.

The invention claimed is:

1. An edge-lit motor vehicle display apparatus comprising:
    a backlight unit integrated with at least one heat transfer device, the at least one heat transfer device comprising
        an anterior capillary tube operable to integrate with a rear side of the backlight unit, the anterior capillary tube further operable to dissipate heat from an anterior of the backlight unit,
        a posterior capillary tube operable to be positioned further away from the rear side of the backlight unit than the anterior tube, the posterior capillary tube further operable to dissipate heat from a posterior of the backlight unit, and
        a phase changing medium operable to fluidly transfer between the anterior capillary tube and the posterior capillary pillar tube during a heat transfer process,
        wherein the phase changing medium is operable to phase change between a gaseous state and a liquid state during the heat transfer process, to release latent heat from the rear side of the backlight unit.

2. The edge-lit motor vehicle display apparatus according to claim 1, wherein the anterior capillary tube and the posterior capillary tube are connected by a C-shape connector, thereby forming a U-shape heat transfer device having a gap between the anterior capillary tube and the posterior capillary tube.

3. The edge-lit motor vehicle display apparatus according to claim 2, wherein the C-shape connector has a bending radius of at least three times a diameter of the heat transfer device.

4. The edge-lit motor vehicle display apparatus according to claim 2, wherein the gap between the anterior capillary tube and the posterior capillary tube is at least 5 mm.

5. The edge-lit motor vehicle display apparatus according to claim 1, wherein the anterior capillary tube has a length of at least 150 mm.

6. The edge-lit motor vehicle display apparatus of claim 1, wherein the posterior capillary tube is at least partially positioned within a heat sink.

7. The edge-lit motor vehicle display apparatus according to claim 1, wherein during the heat transfer process,
    the phase changing medium vaporises to the gaseous state within the anterior capillary tube to dissipate heat from the anterior of the backlight unit; and
    the phase changing medium is fluidly transferred from the anterior capillary tube in the gaseous state to the posterior capillary tube.

8. The edge-lit motor vehicle display apparatus according to claim 7, wherein during the heat transfer process, in response to the phase changing medium being fluidly transferred to the posterior capillary tube, the phase changing medium condenses to the liquid state within the posterior capillary tube when latent heat is released from the phase changing medium.

9. The edge-lit motor vehicle display apparatus according to claim 1, wherein the anterior capillary tube further comprises a T-shape bar.

10. The edge-lit motor vehicle display apparatus according to claim 1, wherein the posterior capillary tube has a length shorter than the anterior capillary tube.

11. A method of assembling an edge-light motor vehicle display apparatus for use in a motor vehicle, the method comprising:
   providing at least one heat transfer device, the at least one heat transfer device comprising
      an anterior capillary tube operable to integrate with a rear side of a backlight unit, the anterior capillary tube further operable to dissipate heat from an anterior of the backlight unit,
      a posterior capillary tube operable to be positioned further away from the rear side of the backlight unit than the anterior tube, the posterior capillary tube further operable to dissipate heat from a posterior of the backlight unit, and
      a phase changing medium operable to fluidly transfer between the anterior capillary tube and the posterior capillary pillar tube during a heat transfer process,
      wherein the phase changing medium is operable to phase change between a gaseous state and a liquid state during the heat transfer process, to release latent heat from the rear side of the backlight unit;
   providing a housing fora rear side of the motor vehicle display apparatus, the housing comprises at least one slot; and
   extending at least a portion of the at least one heat transfer device with the at least one slot of the housing, thereby yielding an edge-lit motor vehicle display apparatus integrated with at least one heat transfer device.

12. The method according to claim 11, wherein the at least a portion of the at least one heat transfer device is a T-shape bar.

13. The method according to claim 12, further comprising adhering an array of light emitting diodes along a length of the T-shape bar.

14. The method according to claim 13, further comprising fixing a light conductor adjacent to the T-shape bar, the light conductor for transmitting light rays towards a viewing area of the motor vehicle display apparatus.

15. The method according to claim 14, further comprising aligning the array of light emitting diodes along the length of the T-shape bar to a length of the light conductor, thereby providing a backlight unit for an edge-lit motor vehicle display.

\* \* \* \* \*